US010719135B2

(12) United States Patent
Chao

(10) Patent No.: US 10,719,135 B2
(45) Date of Patent: Jul. 21, 2020

(54) MOUSE DEVICE WITH PRESTRESS REGULATING STRUCTURES

(71) Applicants: DEXIN ELECTRONIC LTD., Dongguan, Guangdong (CN); DEXIN CORPORATION, New Taipei (TW)

(72) Inventor: Pan-Chun Chao, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 531 days.

(21) Appl. No.: 15/081,871

(22) Filed: Mar. 26, 2016

(65) Prior Publication Data

US 2017/0277275 A1    Sep. 28, 2017

(51) Int. Cl.
*G06F 3/02*    (2006.01)
*G06F 3/0354*    (2013.01)

(52) U.S. Cl.
CPC ........ *G06F 3/0202* (2013.01); *G06F 3/03543* (2013.01)

(58) Field of Classification Search
CPC ...... G06F 3/03543; G06F 3/0202; G06F 1/16; G06F 3/03541; G06F 2203/0331; G06F 2203/0332; G06F 2203/0333; G06F 2203/0334; G06F 2203/0335; G06F 2203/0336; G06F 2203/0337; G09G 5/08; G09G 5/00; H01H 21/02
See application file for complete search history.

(56) References Cited

U.S. PATENT DOCUMENTS

| 6,611,139 B1* | 8/2003 | Jackson | G06F 3/03543 200/6 A |
|---|---|---|---|
| 2001/0028345 A1* | 10/2001 | Natsuyama | G06F 3/03545 345/179 |
| 2007/0002020 A1* | 1/2007 | Ranta | G06F 3/0317 345/166 |
| 2009/0009473 A1* | 1/2009 | Ho | G06F 3/03543 345/163 |
| 2011/0050651 A1* | 3/2011 | Chen | G06F 3/03542 345/179 |
| 2014/0332359 A1* | 11/2014 | Chiang | H01H 21/02 200/339 |
| 2017/0220139 A1* | 8/2017 | Forde | G06F 3/0202 |
| 2018/0136728 A1* | 5/2018 | Unnikrishnan | G06F 3/016 |

* cited by examiner

*Primary Examiner* — Dong Hui Liang
(74) *Attorney, Agent, or Firm* — Li & Cai Intellectual Property (USA) Office

(57) ABSTRACT

A mouse device with prestress regulating structures has a body with a space, a printed circuit board and a micro switch are disposed in the space. The micro switch is electrically connected to the printed circuit board. A button unit is disposed in the body by means of a shaft and is available to move up and down relative to the body. The button unit has a first end and a second end and is configured to engage with the micro switch. A first prestress regulating structure is accommodated in the space and abutted against the bottom side of the first end for regulating a first prestress force applied to the first end. A second prestress regulating structure is accommodated in the space and abutted against the bottom side of the second end for regulating a second prestress force applied to the second end.

4 Claims, 7 Drawing Sheets

MOUSE DEVICE WITH PRESTRESS REGULATING STRUCTURES

BACKGROUND OF THE INVENTION

1. Field of the Invention

The present invention is related to a mouse device, more particularly, to the mouse device with prestress regulating structures.

2. Description of Related Art

In typical use, a keyboard and mouse are common input devices. The mouse has at least two buttons, and a mouse wheel is disposed between the right button and left button. Computer games are greatly popular and the exceptional players are broadcast live by the internet, and some take to playing games as a profession.

Playing computer games has become a formal competition and the mouse buttons are pressed thousands of times during the game. Therefore, the mouse buttons are depleted and do not respond to the controls sensitively. There are a lot of manufacturing techniques regarding the mouse button, but the structure of these techniques is usually complex and the production costs increase accordingly.

In summary, the inventor of this instant disclosure has contributed to research and developed the mouse device with prestress regulating structures of the instant disclosure to overcome the abovementioned drawbacks.

SUMMARY OF THE INVENTION

The object of the instant disclosure is to provide a mouse device with prestress regulating structures. The mouse device with prestress regulating structures of the present invention is capable of regulating the prestress force according to the user preference.

In order to overcome the abovementioned problem, the present invention provides the mouse device with prestress regulating structures. The mouse device with prestress regulating structures includes a body with a space, and a printed circuit board is disposed in the space. A micro switch is electrically connected to the printed circuit board. A button unit is disposed in the body by means of a shaft and is available to move up and down relative to the body. The button unit is configured to engage with the micro switch and has a first end and a second end. A first prestress regulating structure is disposed in the space and located on one side of the shaft. The first prestress regulating structure abuts against a bottom side of the first end and is configured to regulate a first prestress force applied to the first end. A second prestress regulating structure is disposed in the space and located on another side of the shaft. The second prestress regulating structure abuts against a bottom side of the second end and is configured to regulate a second prestress force applied to the second end.

The first prestress regulating structure further comprises a tube having an upper opening, a lower opening, and an interior space connected to the upper opening and the lower opening. A regulating rod is accommodated into the interior space, and an outer surface of the regulating rod is formed with an external thread, and an inner wall of the tube is formed with an internal thread corresponding to the external thread. The regulating rod has a projection portion corresponding to the upper opening, and the projection portion extends outward from the tube through the upper opening. The first prestress regulating structure further comprises a spring having a first contact and a second contact portion. The button unit connects to the first contact portion, and the projection portion abuts against the second contact portion.

The second prestress regulating structure further comprises a tube having an upper opening, a lower opening, and an interior space connected to the upper opening and the lower opening. A push rod is accommodated into the interior space and has a projection portion and a flange, and the projection portion extends outward from the tube through the upper opening. A first elastic element is placed around the push rod and located between the upper opening and the flange. A second elastic element is placed around the push road and located between the lower opening and the flange. A regulating nut is disposed in the lower opening and abutted against the second elastic element.

The instant disclosure has the follow advantages. The first prestress regulating structure provides a first prestress force to the first end of the button unit, and the second prestress regulating structure provides a second prestress force to the second end of the button unit. When the user manipulates the first prestress regulating structure or the second prestress regulating structure, the first prestress force and the second prestress force can be adjusted for user preference, so the mouse device can well reflect the operation technique of the user. The mouse device with prestress regulating structures of this invention is simple in structure, has high reliability, and low cost.

In order to further appreciate the characteristics and technical contents of the present invention, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in order to avoid obscuring the concepts of the subject technology. Like components are labeled with identical element numbers for ease of understanding. Reference numbers may have letter suffixes appended to indicate separate instances of a common element while being referred to generically by the same number without a suffix letter.

Figure 1:
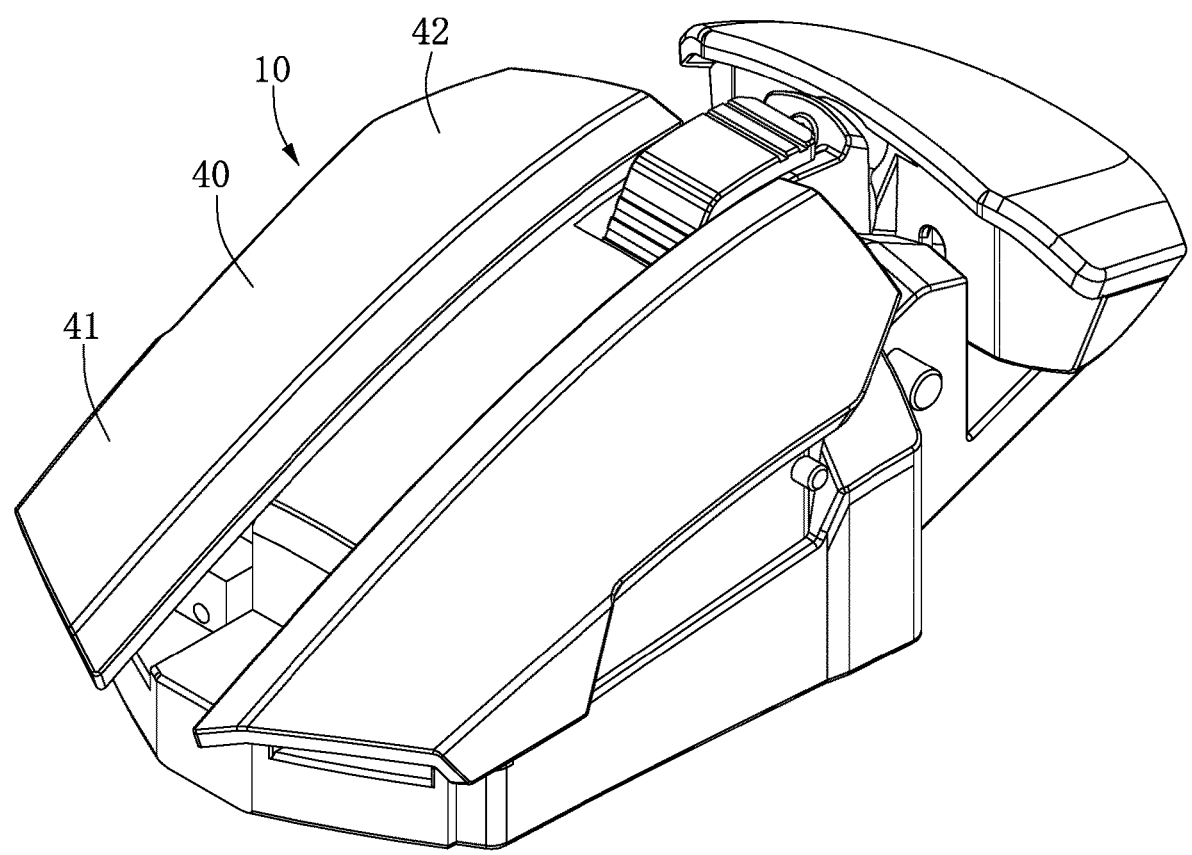
FIG. 1 shows a perspective view of a mouse device with prestress regulating structures in the instant disclosure.
Figure 2:
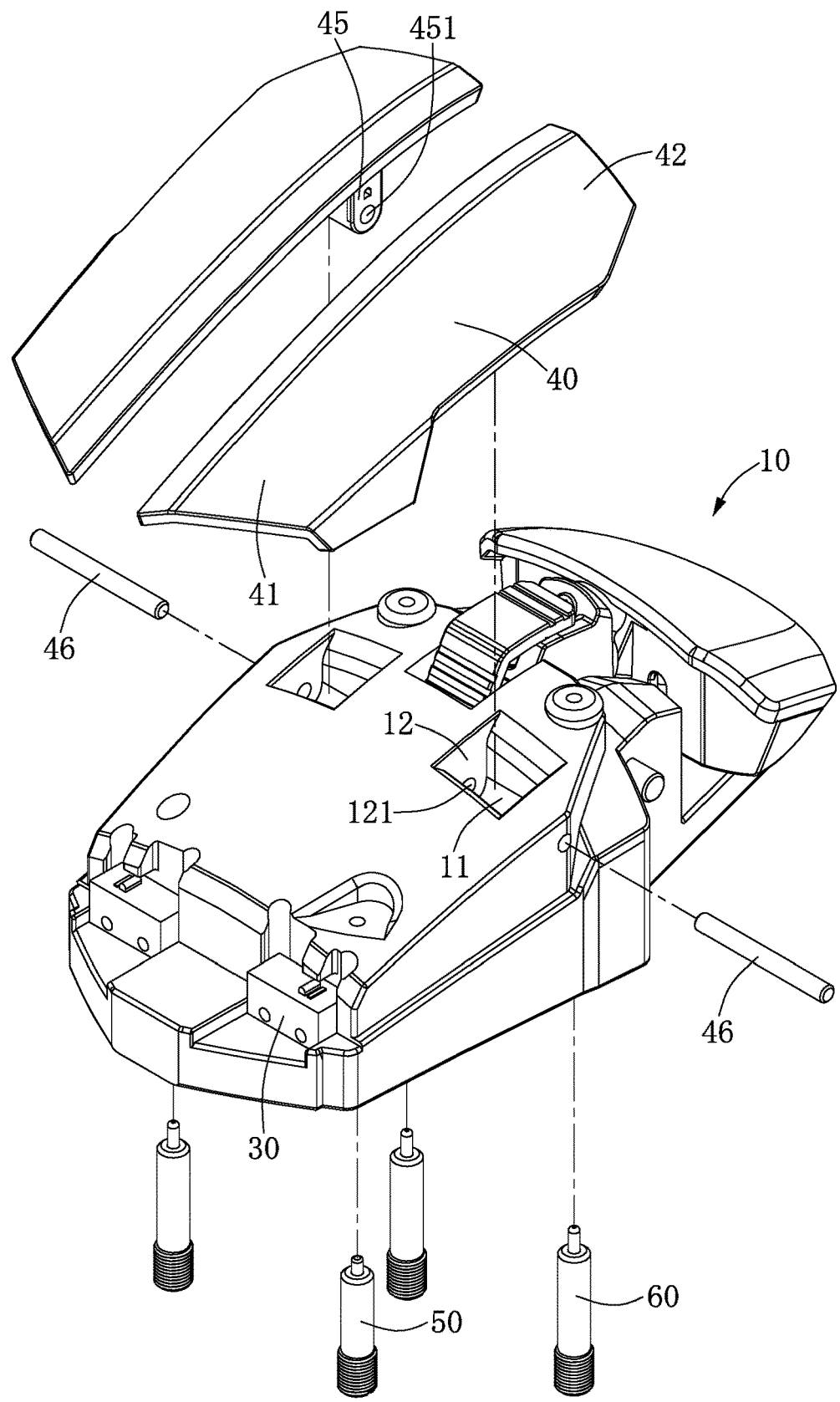
FIG. 2 shows a first exploded view of the mouse device with prestress regulating structures in the instant disclosure.
Figure 3:
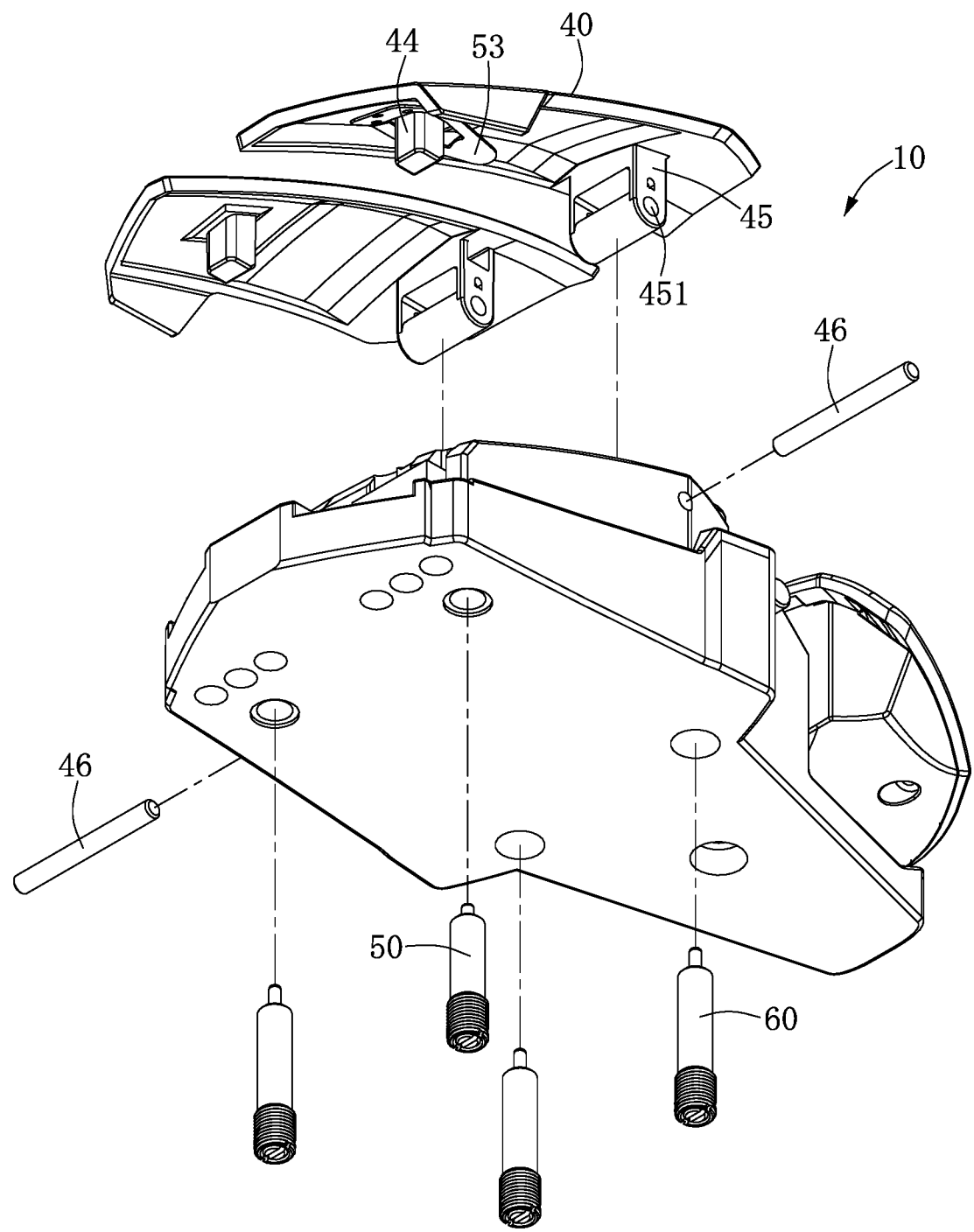
FIG. 3 shows a second exploded view of the mouse device with prestress regulating structures in the instant disclosure.

Please refer to FIGS. 1 to 3. The instant disclosure that provides a mouse device with prestress regulating structures includes a body 10 with a space 11, and a printed circuit board 20 is disposed in the space 11. A micro switch 30 is electrically connected to the printed circuit board 20. The space 11 is an interior space of the body 10 and parts such as an optical module, a wheel module, and other electronic components, etc., can be disposed therein. These conventional parts will not described in detail and are not shown in drawings.

A button unit 40 is disposed in the body 10 by means of a shaft 46 and is available to move up and down relative to the body 10. The button unit 40 is depressed by the user so a micro switch 30 is pressed accordingly, and the button unit 40 comprises a first end 41 and a second end 42.

A first prestress regulating structure, or a first stress regulating structure 50 is disposed in the space 11 and is located on one side of the shaft, in other words, the first prestress regulating structure 50 is corresponding to the first end 41 of the button unit 40. The first prestress regulating structure 50 abuts against a bottom side of the first end 41 of the button unit 40 and is configured to regulate a first prestress force applied to the first end 41.

A second prestress regulating structure, or a second stress regulating structure 60 is disposed in the space 11 and is located on another side of the shaft 46. The second prestress regulating structure abuts against a bottom side of the second end 42 of the button unit 40 and is configured to regulate a second prestress force applied to the second end 42.

Figure 4A:
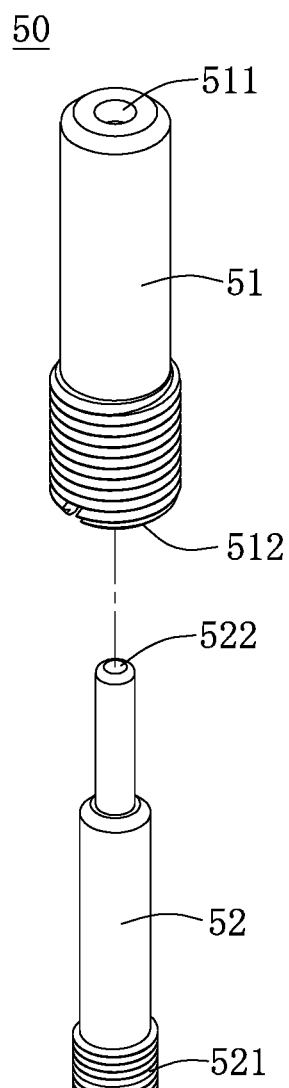
FIG. 4A and FIG. 4B show perspective views of a first prestress regulating structure of the mouse device with prestress regulating structures in the instant disclosure.
Figure 4B:
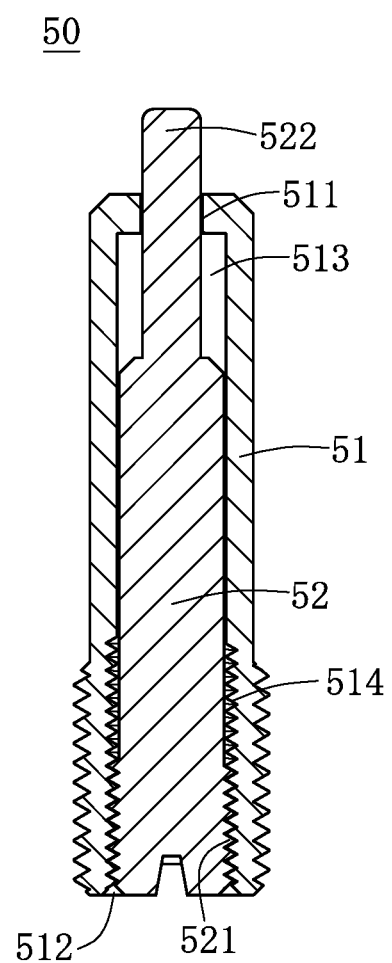

Please refer to FIGS. 4A and 4B. In this embodiment, the first prestress regulating structure 50 further comprises a tube 51 and a regulating rod 52. The tube 51 has an upper opening 511, a lower opening 512, and an interior space 513 connected to the upper opening 511 and the lower opening 512. The regulating rod 52 is accommodated into the interior space 513, and one end of the regulating rod 52 adjacent to the lower opening 512 has an outer surface formed with an external thread 521. An inner wall of the tube 51 is formed with an internal thread 514 corresponding to the external thread 521 of the regulating rod 52. One end of the regulating rod 52 has a projection portion 522 corresponding to the upper opening 511. The projection portion 522 extends outward from the tube 51 through the upper opening 511.

Figure 6:
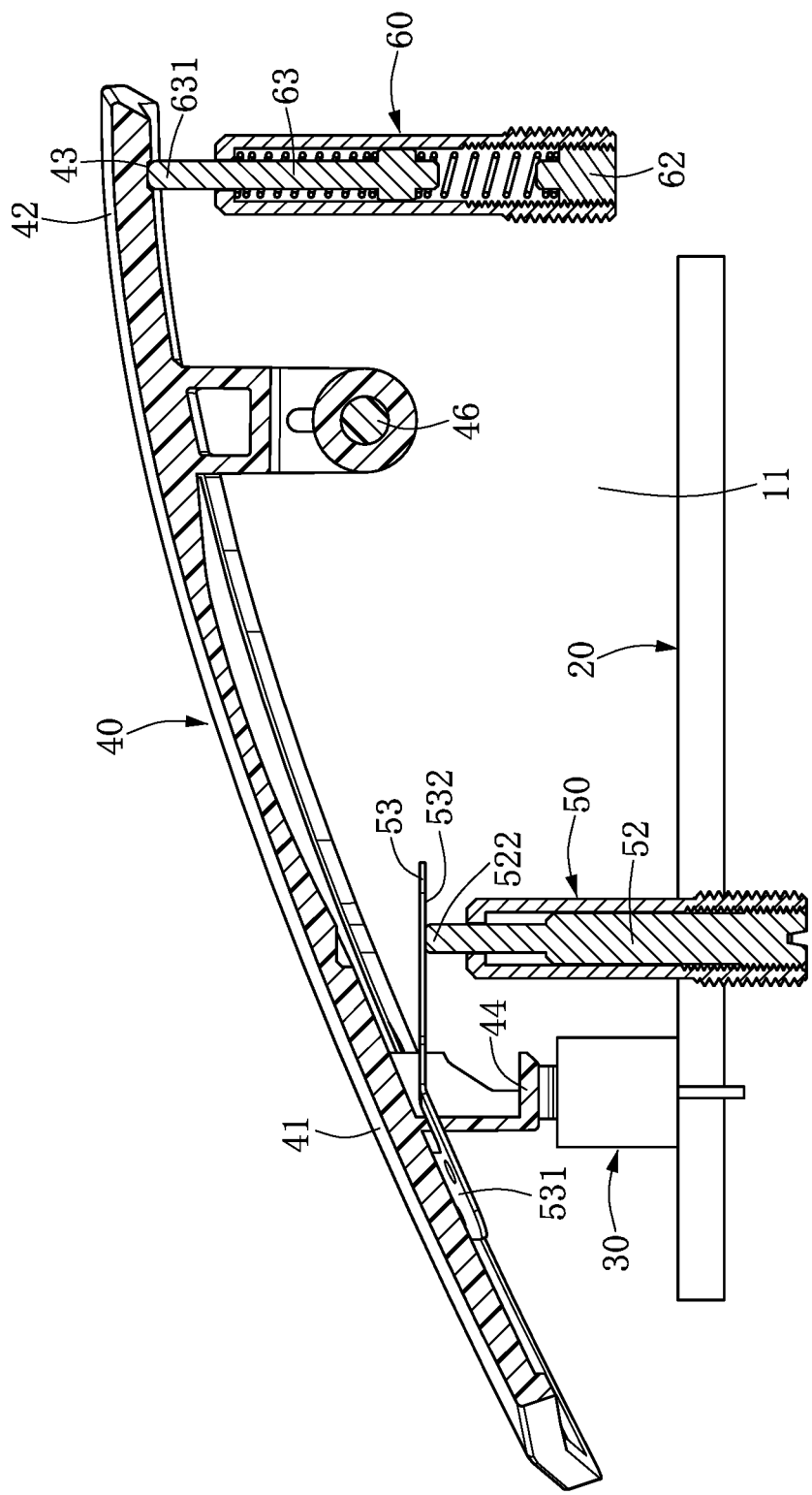
FIG. 6 shows a schematic diagram of the mouse device with prestress regulating structures in the instant disclosure.

Please refer to FIG. 6. The first prestress regulating structure 50 further comprises a spring 53 having a first contact portion 531 and a second contact portion 532. The button unit 40 is connected to the first contact portion 531 and the projection portion 522 of the regulating rod 52 abuts against the second contact portion 532. More specifically, the spring 53 is disposed on the bottom side of the button unit 40 and corresponding to the first end 41 of the button unit 40. The first contact portion 531 of the spring 53 is connected to the button unit 40, and the bottom side of the second contact portion 532 of the spring 53 is abutted against by the projection portion 522 of the first prestress regulating structure 50, so a first prestress force is applied to the first end 41 of the button unit 40.

Figure 5A:
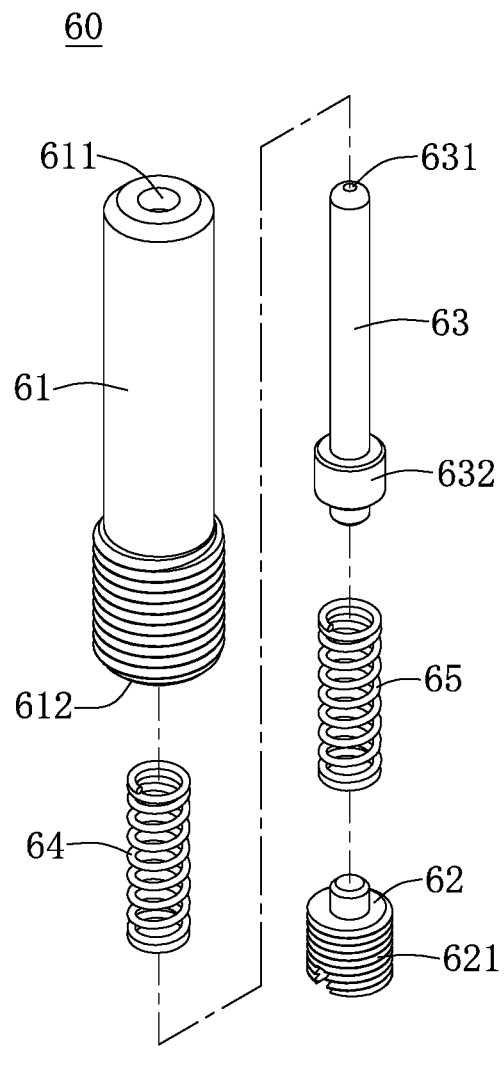
FIG. 5A and FIG. 5B show perspective views of a second prestress regulating structure of the mouse device with prestress regulating structures in the instant disclosure.
Figure 5B:
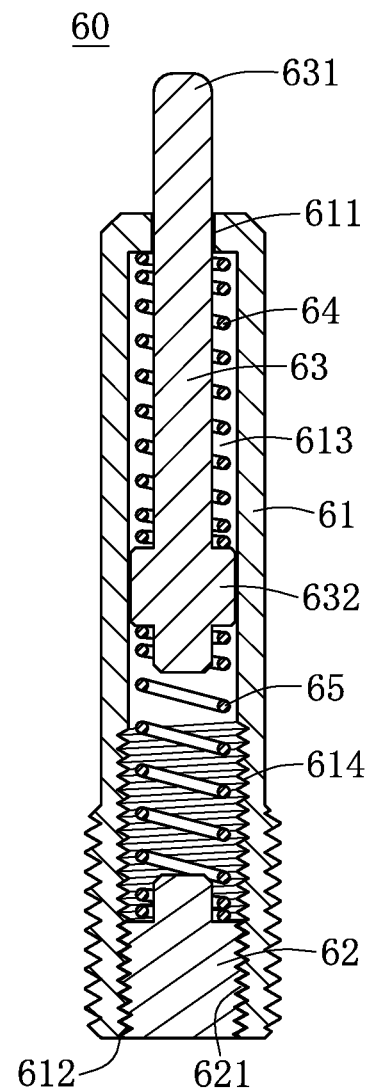

Please refer to FIGS. 5A and 5B. In this embodiment, the second prestress regulating structure further comprises a tube 61, and the tube 61 has an upper opening 611, a lower opening 612, and an interior space 613 connected to the upper opening 611 and the lower opening 612. A push rod has a projection portion 631 and a flange 632 installed in the interior space 613. The projection portion 631 corresponding to the upper opening 611 is formed in an end of the push rod 63, and the projection portion 631 extends from the tube 61 through the upper opening 611. The middle portion of the push rod 63 is formed with the flange 632, and a first elastic element 64 is placed around the push rod 63 and between the upper opening 611 and the flange 632. A second elastic element 65 is placed around the push rod 63 and between the flange 632 and the lower opening 613. A regulating nut 62 is disposed in the lower opening 612, and the top end of the regulating nut 62 is abutted against the second elastic element 65. The outer surface of the regulating nut 62 is formed with an external thread 621, and the inner wall of the tube 61 is formed with an interior thread 614 corresponding to the exterior thread 621.

In this embodiment, an elasticity coefficient of the first elastic element 64 is less than an elasticity coefficient of the second elastic element 65. In other words, the second elastic element 65 is harder, whereas the first elastic element 64 is relatively softer. One end abutted against the button unit 40 of the projection portion 631 is with a rounded shape.

Please refer to FIG. 6. The bottom side of the button unit 40 corresponding to the second prestress regulating structure 60 is formed with a recess 43, and the recess 43 is corresponding to the projection portion 631 of the push rod 63. The bottom side of the button unit 40 is formed with a pressing portion 44 corresponding to the micro switch 30. More specifically, when the button unit 40 depresses, the pressing portion 44 is moved downward accordingly, so the pressing portion 44 presses the micro switch 30. The first prestress regulating structure 50 is disposed between the micro switch 30 and the shaft 46, and the shaft 46 is disposed between the first regulating structure 50 and the second regulating structure 60.

Please refer to FIGS. 2, 3 and 6. In this embodiment, the button unit 40 further comprises a pivot portion 45, and a pivot hole 451 is formed in the pivot portion 45 and configured to be penetrated through by the shaft 46. As aforementioned described, the button unit 40 is disposed in the body 10 by means of the shaft 46 and is available to move up and down relative to the body 10. The body 10 has a coupling portion 12 and the coupling portion 12 is formed with a coupling hole 121 corresponding to the shaft 46. The shaft 46 enters the coupling hole 121 of the coupling portion 12 after it penetrates through the pivot hole 451 of the pivot portion 45 of the button unit 40.

Please refer to FIGS. 4A, 4B, 5A, 5B, and 6. According to the mouse device with prestress regulating structures of the present invention, the user utilizes a screwdriver to rotate the regulating rod 52 of the first prestress regulating structure 50, and manipulates a first prestress force of the projection portion 522 of the regulating rod 52 abutted against the first end 41 of the button unit 40. In other words, the first prestress force of the first prestress regulating structure 50 applied to the first end 41 of the button unit 40 is manipulated by the user.

Similarly, the user utilizes the screwdriver to rotate the regulating nut 62 of the second prestress regulating structure 60, and manipulates a second prestress force of the projection portion 631 of the push rod 63 of the second prestress regulating structure 60 abutted against the second end 42 of the button unit 40. In other words, the second prestress force of the second prestress regulating structure 60 applied to the second end 42 of the button unit 40 is manipulated by the user. More specifically, the second elastic element 65 of the second prestress regulating structure 60 is abutted against by the regulating nut 62, and the second elastic element 65 abuts against the flange 632 of the push rod 63, and the flange 632 of the push rod 63 abuts against the first elastic element 64 accordingly. The second prestress regulating structure 60 provides the second prestress force similar to a shock absorber to the button unit 40 by the first elastic element 64 and the second elastic element 65 simultaneously abutted against the flange 632.

More specifically, the user manipulates the first prestress force provided by the first prestress regulating structure 50 and the second prestress force provided by the second regulating structure 60, and manipulates the prestress force of the button unit 40 accordingly. The prestress force is well balanced and the prestress force of the mouse button is manipulated precisely according to the user's preference.

For instance, when the user manipulates the first prestress regulating structure 50, the projection portion 522 of the regulating rod 52 is ascended and abutted against the first end 41 of the button unit 40, and the second end 42 of the button unit 40 is descended accordingly, meanwhile the prestress force of the button unit 40 grows, and the user needs to increase the force applied to the button unit 40 for operating the button unit 40.

Conversely, when the user manipulates the second prestress regulating structure 60, the projection portion 631 of the push rod 63 is ascended and abutted against the second end 42 of the button unit 40, and the first end 41 of the button unit 40 is descended accordingly, meanwhile the prestress force of the button unit is reduced, and a lesser force applied to the button unit 40 by the user is needed. In summary, the prestress force applied to the button unit 40 is variable, and the user can manipulate the first prestress regulating structure 50 and the second prestress regulating structure 60 according to demand.

Figure 7:
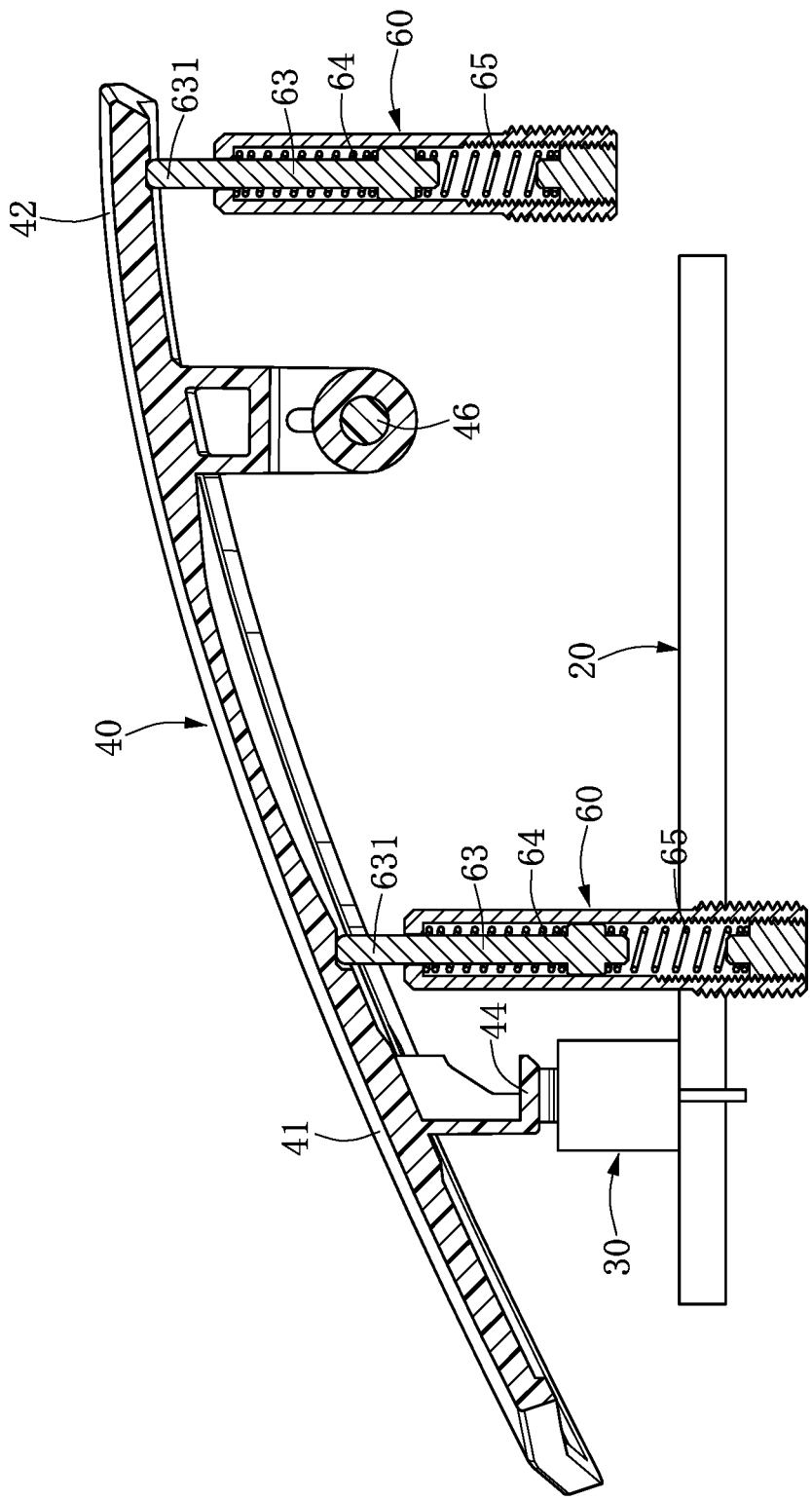
FIG. 7 shows a schematic diagram of another embodiment of the mouse device with prestress regulating structures in the instant disclosure.

Please refer to FIG. 7, where another embodiment of the present invention is provided. The difference between this embodiment and the foregoing embodiment is that a prestress regulating structure applied to the first end 41 of the button unit 40 is the second prestress regulating structure 60. In other words, the bottom sides of the first end 41 and the second end 42 are disposed on the second prestress regulating structure 60 respectively. In practice, the bottom sides of the first end 41 and the second end 42 may be placed with the first prestress regulating structure 50 respectively. The present invention is not limited to the types of the prestress regulating structures applied to the button unit 40 and the user can replace the prestress regulating structure as needed.

To sum up, the present invention has the following advantages. The prestress force of the button unit can be manipulated as required, and meets the demand of the pressing requirement, so the mouse can reflect the operation technique of the user. The present invention is simple in design, and the production costs are competitive.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A mouse device, comprising:
   a body, having a space, a printed circuit board accommodated into the space, and a switch electrically connected to the printed circuit board;
   a button unit having a pivot portion fixedly connected to a bottom thereof, the button unit disposed on the body, the pivot portion pivotally connected to the body and the button unit available to move up and down relative to the body along an axis defined by the pivot portion, wherein the button unit has a pressing portion, a first end and a second end, the pressing portion formed on a bottom side of the first end of the button unit to press the switch, the pivot portion arranged between the first end and the second end;
   a first stress regulating structure, disposed in the space and located on one side of the pivot portion, wherein the first stress regulating structure abuts against a bottom side of the first end and is configured to regulate a first force applied to the first end of the button unit; and
   a second stress regulating structure, disposed in the space and located on another side of the pivot portion, wherein the second stress regulating structure abuts against a bottom side of the second end and is configured to regulate a second force applied to the second end of the button unit;
   wherein the second stress regulating structure includes:
   a tube having an upper opening, a lower opening, and an interior space connected to the upper opening and the lower opening; and
   a push rod accommodated into the interior space having a projection portion and a flange, wherein the projection portion extends outward from the tube through the upper opening;
   a first elastic element placed around the push rod and located between the upper opening and the flange;
   a second elastic element placed around the push rod and located between the lower opening and the flange; and
   a regulating nut disposed in the lower opening and abutting against the second elastic element, an outer surface of the regulating nut is formed with an external thread, and an inner wall of the tube is formed with an internal thread corresponding to the external thread.

2. The mouse device according to claim 1, wherein the bottom side of the second end of the button unit has a recess corresponding to the projection portion.

3. The mouse device according to claim 2, wherein an end of the projection portion that corresponds is in a round shape.

4. The mouse device according to claim 1, wherein an elasticity coefficient of the first elastic element is less than an elasticity coefficient of the second elastic element.

* * * * *